April 20, 1943.                H. G. CISIN                 2,317,178
                           ELECTRONIC CIRCUIT
                       Original Filed April 26, 1938
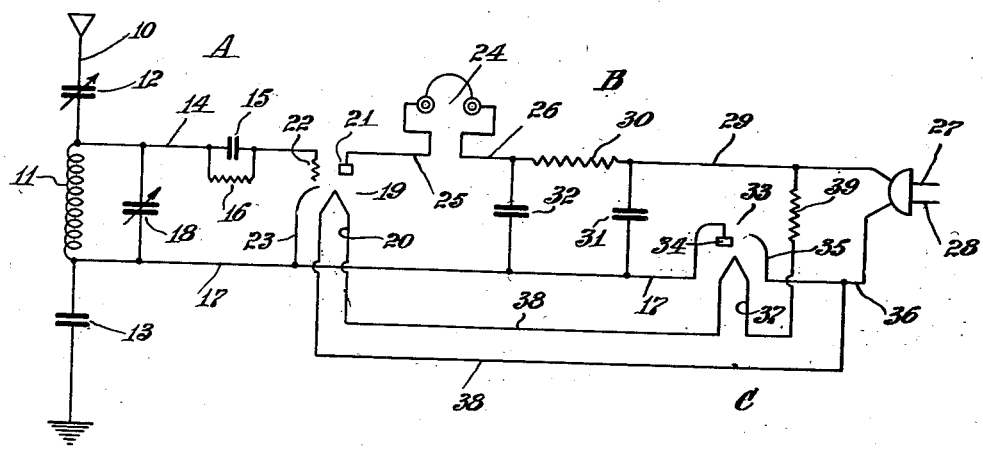
Harry G. Cisin
                                                INVENTOR
Frank P. Wentworth
                                                ATTORNEY.

Patented Apr. 20, 1943

2,317,178

UNITED STATES PATENT OFFICE 2,317,178

ELECTRONIC CIRCUITS

Harry G. Cisin, Brooklyn, N. Y.

Original application April 26, 1938, Serial No. 204,359, now Patent No. 2,251,114, dated July 29, 1941. Divided and this application November 10, 1939, Serial No. 303,733

5 Claims. (Cl. 250—27)

The invention relates to electronic circuits, and more particularly to a device which may be used with either an alternating or a direct current source for supplying current to a radio receiving set, hearing aid or other similar appliances.

Prior to my invention, devices of the general type to which the invention relates have been developed, such devices embodying therein a combination of parts by which a rectifying unit was directly connected with one of the terminals of a source whether of alternating or direct current, and the output of this rectifying unit was delivered to a filter, the rectified and filtered current being impressed upon an amplifying unit, all of the elements in the various units being connected with a common return line having a full metallic connection with the other terminal of the source.

With such devices, a current at the full voltage of the source was impressed upon the anode of a thermionic electronic rectifier, and in the event of the development of a short circuit from the rectifier anode to the return line, the rectifying unit would be ruined. Furthermore, a continued short circuiting from the cathode of the rectifier to the return line would cause an overload upon the rectifying tube, which also would result in the ruination of this tube.

With the above conditions in mind, I have provided a device of the character described, wherein the use of a full metallic connection between the various elements in the different circuits and one terminal of the source is avoided, thus guarding against possibility of interference with a proper and continuing operation as a result of the short circuiting of either the anode or the cathode of the rectifying unit. The arrangement of parts is also such as to permit the operation of the device without impressing upon the rectifying unit the full voltage of the source, thus reducing the load upon the rectifier and avoiding deterioration thereof from such causes.

In a device embodying the invention, the rectifier is so located between the amplifying unit and one terminal of the source, that only a current of low voltage is impressed upon the anode of the rectifier, and the cathode of said rectifier will be of substantially ground potential.

Furthermore, the current impressed upon the anode of the rectifying unit, when the device is operated from an alternating current source, is a filtered current of low voltage, thus ensuring a more effective operation of the rectifying unit.

In the device, there is no connection between the return line and one terminal of the source, except through the electronic path afforded by the rectifying unit, and hence there can be no short circuiting of said anode and no likelihood of injury to the rectifier as a result of such short circuiting. The cathode of the rectifier being of substantially ground potential or the potential of the terminal at the source with which the device is connected, there is no possibility of such short circuiting of the cathode as would result in injury to said rectifier.

Another advantage of the device of the invention is that when a rectifier employing an anode, a cathode and a heater element is used, the heater, the anode and the cathode each may be maintained at a low potential, thus increasing the efficiency of operation of the rectifier and preventing secondary electronic emission which might interfere with the operation of the rectifier.

Furthermore, in the device of my invention, the circuit supplying energy to the heater of the rectifier and to vacuum tubes in the set is isolated from the common return line, there being no metallic connection between the cathodes of the vacuum tubes in the amplifier and the source.

The invention consists in the novel combination and arrangement, in electronic circuits, of the various elements as hereinafter set forth and described, and more particularly pointed out in the claims hereto appended.

In the accompanying drawing I have shown a diagram of one embodiment of the invention used in the operation of a radio receiving set.

In the drawing, the device consists of an amplifying unit A, a filter B and a rectifying unit C.

The amplifying unit, which is capable of wide variation, as shown in the drawing consists of an antenna 10 and a line therefrom to ground, including therein an inductance 11 and condensers 12 and 13, one of which, as 12, is variable, the same as in my co-pending application Serial No. 204,359, filed April 26, 1938, upon which Patent No. 2,251,114 was granted July 29, 1941, of which this is a division. Leading from the antenna is a line 14 having therein the usual condenser 15 and grid leak resistor 16.

The return line of the amplifying unit is shown at 17, this ordinarily being the chassis of the receiving set. Connected across this return line and the line 14 is the usual tuning condenser 18.

The amplifying unit is shown as having a vacuum tube 19 having a heater element 20, an anode 21, a grid 22 and a cathode 23 connected with the return line 17. The output member of the unit is indicated conventionally at 24, one terminal of this member being connected by a line 25 with the anode 21, and the other terminal thereof being connected by a line 26 with the output of the filter unit B.

The current supply for operating said amplifying unit is derived from a source of either alternating or direct current, such as is commonly used for lighting purposes or the actuation of various electrical devices about a house.

The device is adapted to be connected with the outlet of such a source by means of a plug having terminals 27 and 28, one of these terminals being connected by a line 29 with an inductance or choke 30 of the filter unit.

Connected across the line 29—17 is a condenser 31, and connected across the line 26—17 is a second condenser 32, these condensers being adjacent opposite terminals of the inductance or choke 30.

It will be noted that the line 17 does not extend to, and is not physically connected with the terminal 28 so as to afford an all-metallic connection from the amplifying unit to said terminal 28.

The circuit including the amplifying unit is completed through a thermionic electronic rectifying device 33 having an anode 34 with which the line 17 is connected, a cathode 35 connected by the line 36 with the terminal 28, and a heater 37 which is preferably connected in series with the heater 20 and energized by means of a current delivered through a line 38 having a resistor 39 therein. One end of the line 38 is connected with the line 29, and the other terminal thereof is connected with the line 36 between the cathode 35 and the source.

With the above arrangement of parts, when the supply is drawn from an alternating current source, one side of the line is connected by an all-metallic conductor 29 with one terminal of the inductance 30 and charges the condensers 31 and 32 in a manner well known in radio work. The other side of the source is connected with the cathode 35 of the rectifying unit, thus limiting the direction of flow of the current to the inductance or choke 30 through the line 29 and securing half-wave rectification of the current.

This arrangement also limits the direction of flow of the current derived from a direct current source, to the inductance or choke 30, through the line 29. When used with direct current, the connection of the terminals 27—28 with the outlet of a direct current source must be such as to ensure the terminal 27 always being connected with the positive side of said source and the terminal 28 with the negative side thereof. In the use of the device, a proper connection of the terminals 27 and 28 with the outlet terminals will be determined by trial and error. If connection is not made with the proper polarity, the amplifying unit will not operate. This applies only when current from the direct current source is used, since the terminals 27 and 28 may be connected promiscuously with the terminals of an alternating current source.

Radio frequency impulses flow from the antenna 10 to the grid 22, and the current flow from the anode or plate 21 to the cathode 23, as modulated by the grid, will be to the return line 17, as is usual in radio receiving sets and in other devices.

It is obvious that the invention may be applied to radio sets having a plurality of radio frequency amplifying units and audio frequency amplifying units, instead of to a set having only one tube, a detector, as shown in the drawing, without changing the operative effect of the circuits illustrated in the drawing. It is also obvious that if the device is used with a hearing aid or other appliances, there will be a wide range in the variation of the amplifying unit or translating device to permit the adaptation of the invention thereto.

The current flow in a device embodying the invention is as follows:

If the device be connected with an alternating current source, assuming the terminal 27 to have a positive polarity, it will flow through the line 29, inductance 30, condensers 31 and 32 of the filter to the output member 24 of the amplifying unit, and from this member to the anode 21 of the amplifying unit or tube 19, through the cathode 23 to the return line 17, through which it flows to the anode 34 of the electronic rectifying unit C to the cathode 35 of said unit, and therefrom through the line 36 to the terminal 28.

The locating of the electronic rectifying unit between the return line 17 and the terminal 28 prevents the flow of current from the terminal 28 to the amplifying unit when said terminal has a positive polarity.

The filter unit B smooths out the current delivered thereto in the above manner and controls the voltage of the current impressed upon the amplifying unit, and the current impressed upon the anode 34 is, therefore, substantially a direct current, or a pulsating direct current, the voltage of which, as compared with the voltage of the source, is greatly reduced by the resistance or load of the amplifying unit.

When the device is used with current derived from a direct current source, it is essential that the terminal 27 be connected with the positive pole of the outlet of this source. With a proper connection with the source, the path of the current will be identical with that above described in connection with alternating current, with the exception that the action of the condensers 31 and 32 is practically negligible, although with fluctuations in the direct current there may be condenser action.

It will be noted that at the point of connection of the line 38 with the line 36, the potential is practically zero, and that therefore the potential of the cathode 35 will be substantially zero, or that the potential of the cathode and the lighting circuit will be substantially the same. Consequently, there can be no short circuiting of the cathode 35 in relation to the line 36. It will also be noted that the anode 34 is connected only with the line 17, and that therefore there can be no short circuiting of this anode. This condition is true whether the source be of alternating or direct current.

Furthermore, since the heaters of the amplifying unit and of the rectifying unit are connected in series across the line from the source, and are not connected with any of the circuits in the amplifying unit, except at a point where the potential is substantially ground, there can be no interference in the operation of the amplifying unit by the presence of raw alternating current in the heating circuit, or of a secondary electronic emission.

The term "direct current," as herein used, refers to a continuous flow direct current, as well as a pulsating direct current, and in the device shown and described, variations in the potential of the source will not interfere with the operation of the amplifying unit or translating device.

It is not my intention to limit the invention to the particular number and arrangement of parts shown in the accompanying diagram, it being obvious that such may be varied without departing from the spirit and scope of the invention.

Having described the invention, what I claim as new and desire to have protected by Letters Patent, is:

1. In a device of the character described, the combination with an amplifying unit embodying an output, an input, a thermionic vacuum tube, and a return line, of a filter, connections between said filter and said amplifying unit, means connecting said filter with one terminal of a source of either alternating or direct current, an electronic rectifying unit having an anode and a cathode, connections between said anode and said amplifying unit through said return line, connections between said cathode and the other terminal of said source, whereby said cathode is isolated from said return line and is maintained substantially at ground potential, and the potential impressed upon said anode substantially equals the voltage drop across said rectifying unit, means for energizing said rectifying unit, and connections including said means between one side of the source and said filter, and between the other side of the source and the cathode of said rectifying unit, whereby said energizing means is maintained at a potential below that of the current at the source.

2. In a device of the character described, the combination with an amplifying unit embodying an output, an input, a thermionic vacuum tube, and a return line, of a filter, connections between said filter and said amplifying unit, means connecting said filter with one terminal of a source of either alternating or direct current, an electronic rectifying unit having an anode, a cathode and a heater, connections between said anode and said amplifying unit through said return line, connections between said cathode and the other terminal of said course, whereby said cathode is isolated from said return line and is maintained substantially at ground potential, and the potential impressed upon said anode substantially equals the voltage drop across said rectifying unit, a circuit supplying energy to said heater, and means whereby said circuit is maintained at a potential below the potential of the current at the source, one terminal of said circuit being connected with the connections between said source and said filter, and the other terminal thereof being connected with the connections between said cathode and the other terminal of said source, whereby said heater is isolated from all other circuits in the device and is maintained at a potential preventing secondary electronic emission between the heater and the cathode of said rectifying unit.

3. In a device of the character described, the combination with an amplifying unit embodying an output, an input, a vacuum tube having a heater, and a return line, of a filter, connections between said filter and said amplifying unit, means connecting said filter with one terminal of a source of either alternating or direct current, an electronic rectifying unit having an anode, a cathode and a heater, connections between said anode and said amplifying unit through said return line, connections between said cathode and the other terminal of said source, whereby said cathode is isolated from said return line and is maintained substantially at ground potential, and the potential impressed upon said anode substantially equals the voltage drop across said rectifying unit, said heaters being connected in series in a circuit supplying energy thereto, and means whereby said circuit is maintained at a potential below the potential of the current at the source, one terminal of said circuit being connected with the connections between said source and said filter, and the other terminal thereof being connected with the connections between the cathode of said rectifying unit and the other terminal of said source, whereby the heater of said rectifying unit is isolated from all other circuits in the device and is maintained at a potential preventing secondary electronic emission between the heater and the cathode of said rectifying unit.

4. In a device of the character described, the combination with an amplifying unit embodying an output, an input, a thermionic vacuum tube, and a return line, of a filter, connections between said filter and said amplifying unit, means connecting said filter with one terminal of a source of either alternating or direct current, an electronic rectifying unit having an anode, a cathode and a heater, connections between said anode and said amplifying unit through said return line, connections between said cathode and the other terminal of said source, whereby said cathode is isolated from said return line and is maintained substantially at ground potential, and the potential impressed upon said anode substantially equals the voltage drop across said rectifying unit, a circuit supplying energy to said heater, and a resistor in said circuit, one terminal of said circuit being connected with the connections between said source and said filter, and the other terminal thereof being connected with the connections between said cathode and the other terminal of said source, whereby said heater is isolated from all other circuits in the device and is maintained at a potential preventing secondary electronic emission between the heater and the cathode of said rectifying unit and said rectifying unit heater is maintained at a potential below that of the current at the source.

5. In a device of the character described, the combination with an amplifying unit embodying an output, an input, a vacuum tube having a heater, and a return line, of a filter, connections between said filter and said amplifying unit, means connecting said filter with one terminal of a source of either alternating or direct current, an electronic rectifying unit having an anode, a cathode and a heater, connections between said anode and said amplifying unit through said return line, connections between said cathode and the other terminal of said source, whereby said cathode is isolated from said return line and is maintained substantially at ground potential, and the potential impressed upon said anode substantially equals the voltage drop across said rectifying unit, said heaters being connected in series in a circuit supplying energy thereto and having a resistor therein, one terminal of said circuit being connected with the connections between said source and said filter, and the other terminal thereof being connected with the connections between the cathode of said rectifying unit and the other terminal of said source, whereby the heater of said rectifying unit is isolated from all other circuits in the device and is maintained at a potential preventing secondary electronic emission between the heater and the cathode of said rectifying unit and said rectifying unit heater is maintained at a potential below that of the current at the source.

HARRY G. CISIN.